(12) United States Patent
Peplinski et al.

(10) Patent No.: US 8,687,348 B2
(45) Date of Patent: Apr. 1, 2014

(54) INTEGRATED SAFETY DISCONNECTS FOR POWER SYSTEMS

(75) Inventors: Jim Peplinski, Fremont, CA (US);
David A. Chan, Sunnyvale, CA (US);
Mitchell Schoch, Pleasanton, CA (US)

(73) Assignee: Bentek Corporation, San Jose, CA (US)

( * ) Notice: Subject to any disclaimer, the term of this patent is extended or adjusted under 35 U.S.C. 154(b) by 240 days.

(21) Appl. No.: 13/223,198

(22) Filed: Aug. 31, 2011

(65) Prior Publication Data
US 2013/0050906 A1    Feb. 28, 2013

(51) Int. Cl.
*H02B 1/01* (2006.01)
*H02B 1/04* (2006.01)
*H02B 1/26* (2006.01)

(52) U.S. Cl.
USPC .......... 361/627; 361/622; 361/631; 361/632; 361/641; 361/643; 361/644

(58) Field of Classification Search
None
See application file for complete search history.

(56) References Cited

U.S. PATENT DOCUMENTS

| | | | |
|---|---|---|---|
| 5,412,528 A | 5/1995 | Mader et al. | |
| 5,722,534 A | 3/1998 | Wright | |
| 5,726,507 A * | 3/1998 | Tipton | 307/147 |
| 5,764,729 A * | 6/1998 | Black et al. | 379/44 |
| 5,784,249 A * | 7/1998 | Pouliot | 361/622 |
| 6,262,880 B1 * | 7/2001 | Fischer et al. | 361/652 |
| 6,570,754 B2 * | 5/2003 | Foley et al. | 361/648 |
| 6,593,520 B2 | 7/2003 | Kondo et al. | |
| 6,621,689 B1 * | 9/2003 | Flegel | 361/631 |
| 6,861,596 B2 * | 3/2005 | Schnackenberg | 200/43.01 |
| 6,881,898 B2 * | 4/2005 | Baker et al. | 174/50 |
| 7,005,590 B1 * | 2/2006 | Willis | 200/50.32 |
| 7,136,278 B2 * | 11/2006 | Allen | 361/647 |
| 7,209,343 B2 * | 4/2007 | Remmert et al. | 361/634 |
| 7,254,009 B2 * | 8/2007 | Allen | 361/647 |
| 7,453,677 B2 | 11/2008 | Bucella et al. | |
| 7,514,815 B2 | 4/2009 | Paik et al. | |
| 7,652,871 B2 * | 1/2010 | Caggiano et al. | 361/652 |
| 7,824,191 B1 * | 11/2010 | Browder | 439/76.1 |
| 7,855,871 B2 | 12/2010 | Hudgins, Jr. et al. | |
| 7,957,121 B1 * | 6/2011 | Nichols | 361/643 |
| 8,305,739 B2 * | 11/2012 | Dozier | 361/627 |
| 8,390,992 B1 * | 3/2013 | Nichols | 361/643 |
| 2011/0121984 A1 | 5/2011 | Schripsema | |
| 2011/0147171 A1 * | 6/2011 | Bhathija et al. | 200/50.12 |
| 2012/0162861 A1 * | 6/2012 | Manahan | 361/643 |

OTHER PUBLICATIONS

SolarBOS—Products, http://www.solarbos.com/products.php, 2011, 2 pages.
SolarBOS Disconnect Combiners, http://www.solarbos.com/products.php?cat=54&prod=14, 2011, 2 pages.
SolarBOS Sub-Array Combiners, http://www.solarbos.com/data/files/1/SolarBOS%20Sub-Array%20Combiners.pdf, 2011, 2 pages.

* cited by examiner

*Primary Examiner* — Boris Chervinsky
(74) *Attorney, Agent, or Firm* — Sawyer Law Group, P.C.

(57) ABSTRACT

Various embodiments provide safety disconnect systems for a power system. In one aspect, a safety disconnect system includes an enclosure operative to receive a plurality of input power lines into the enclosure and provide a plurality of output power lines out of the enclosure. Each input power line is coupled to and paired with a corresponding one of the output power lines, where each input power line and output power line is operative to provide power from a power source. A plurality of switches are provided in the enclosure, each of these switches coupled between an associated one of the pairs of input power line and output power line, and each switch operative to disconnect the associated input power line from the corresponding output power line.

16 Claims, 6 Drawing Sheets

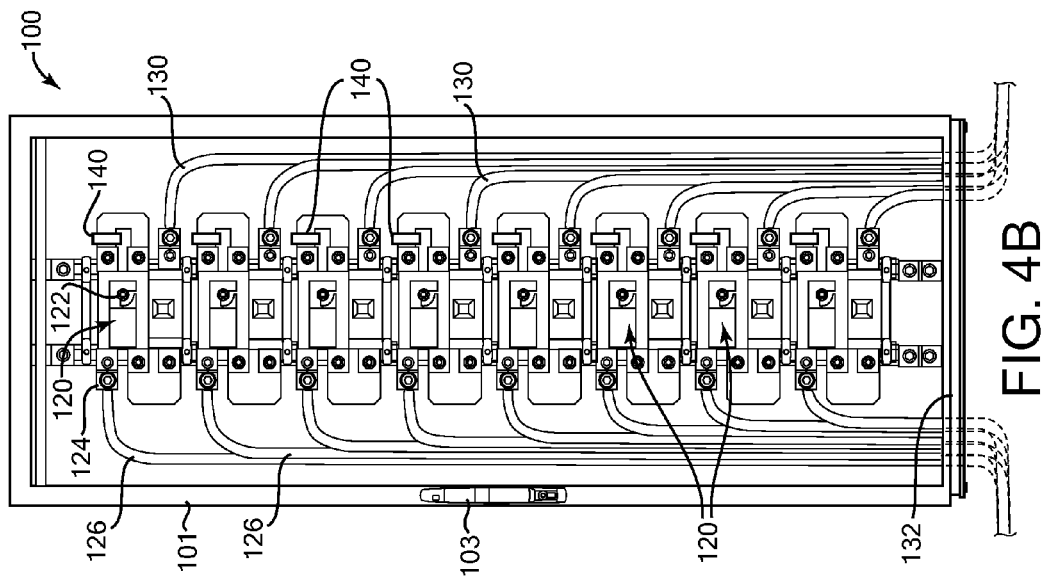
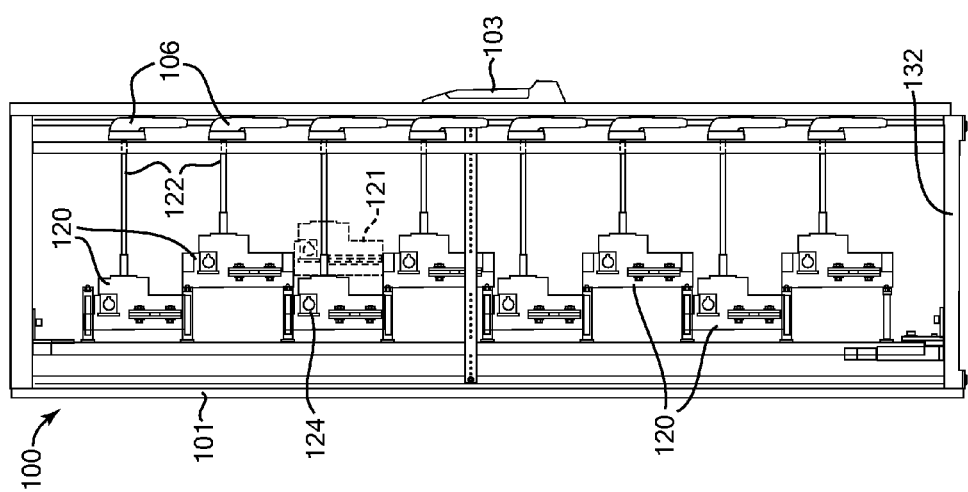
FIG. 4B
FIG. 4A

US 8,687,348 B2

INTEGRATED SAFETY DISCONNECTS FOR POWER SYSTEMS

FIELD OF THE INVENTION

The present invention relates to power distribution systems, and more particularly to safety disconnects for power systems.

BACKGROUND OF THE INVENTION

In the field of power distribution, power feeds from several power sources may be used to provide power to a power distribution unit. For example, in solar power systems, power inputs from several solar panels can combined using combiners and/or recombiners having one or more outputs provided to an inverter or other component of the power system.

Operators of the power system may have a need to disconnect one or more of the power inputs from power sources. For example, if one of the power sources fails, or a connection in the system fails, then the power inputs need to be disconnected from the load so that the faulty components can be repaired or replaced without exposing the workers to high voltage or current. In typical power systems, a safety switch can be connected between a power source and other component using the power. For example, a safety switch can be connected between a combiner and an inverter in a solar power system, or between a combiner and a recombiner.

A problem with existing safety switches is that they are expensive and labor-intensive to install and maintain. Typically one safety switch is provided in each enclosure, such as a metal cabinet, and several enclosures must be provided to allow safety disconnects for several power lines. A conduit with heavy protective cladding must be routed from a power connection to each safety switch enclosure. If multiple power lines are used, such as in solar power systems, a safety enclosure on each power line becomes burdensome and expensive to install and cumbersome to operate and maintain.

SUMMARY OF THE INVENTION

A system and method for providing integrated safety disconnects for power systems is disclosed. In one aspect, a safety disconnect system for a power system includes an enclosure operative to receive input power lines into the enclosure and provide output power lines out of the enclosure, each input power line coupled to and paired with a corresponding one of the output power lines. Each input power line and output power line is operative to provide power from a power source. A plurality of switches are provided in the enclosure, each of these switches coupled between an associated one of the pairs of input power line and output power line. Each switch is operative to disconnect the associated input power line from the corresponding output power line. In another aspect, a method for providing a safety disconnect system provides similar features.

Some embodiments can include additional features. Each switch can be operative to disconnect the associated input power line from its corresponding output power line independently of the connections of the other input power lines and output power lines. The enclosure can be located on a ground surface, and can include a bottom panel operative to allow the input power lines and the output power lines to be routed into the enclosure from the ground surface through the bottom panel. The switches can each include a rotatable handle, and/or can be included in a circuit breaker. The switches can be accessible behind an opening door of the enclosure, and a safety panel behind the door can be openable by an operator only in response to opening all of the switches such that all of the input power lines and output power lines are disconnected.

A current sensing system can be included in the safety disconnect system, operative to sense a current flowing through each pair of input power line and output power line. At least one of the input power lines and output power lines can include an adaptor coupled between this power line and the associated switch, the adaptor including a bend to allow connection between an end of the at least one power line and an input terminal having lengthwise axes at different angles. The input power lines can receive power from at least one solar panel, e.g., connected to at least one string combiner that receives power from at least one solar panel. The output power lines can be connected to at least one recombiner that combines the output power lines into a lesser number of power lines.

BRIEF DESCRIPTION OF THE DRAWINGS

FIGS. 4A-4B are side and front views, respectively, of one example of the interior of the enclosure of a safety disconnect system of FIG. 2;

DETAILED DESCRIPTION

The present invention relates to power systems and more particularly to integrated safety disconnects for power systems. Various modifications to the preferred embodiments and the generic principles and features described herein will be readily apparent to those skilled in the art. Thus, the present embodiments are not intended to be limited to the examples shown but are to be accorded the widest scope consistent with the principles and features described herein.

Embodiments described herein provide a compact and inexpensive safety disconnect enclosure for power systems, in which multiple power lines can be disconnected from the system. The multiple power lines can be routed to a single enclosure that integrates multiple safety disconnects. This allows greater flexibility in disconnecting particular lines, troubleshooting supply problems, and positioning the disconnects without requiring multiple disconnect boxes as in previous implementations.

As used herein, the terms "include," "including," "for example," "e.g.," and variations thereof, are not intended to be terms of limitation, but rather are intended to be followed by the words "without limitation."

Figure 1:
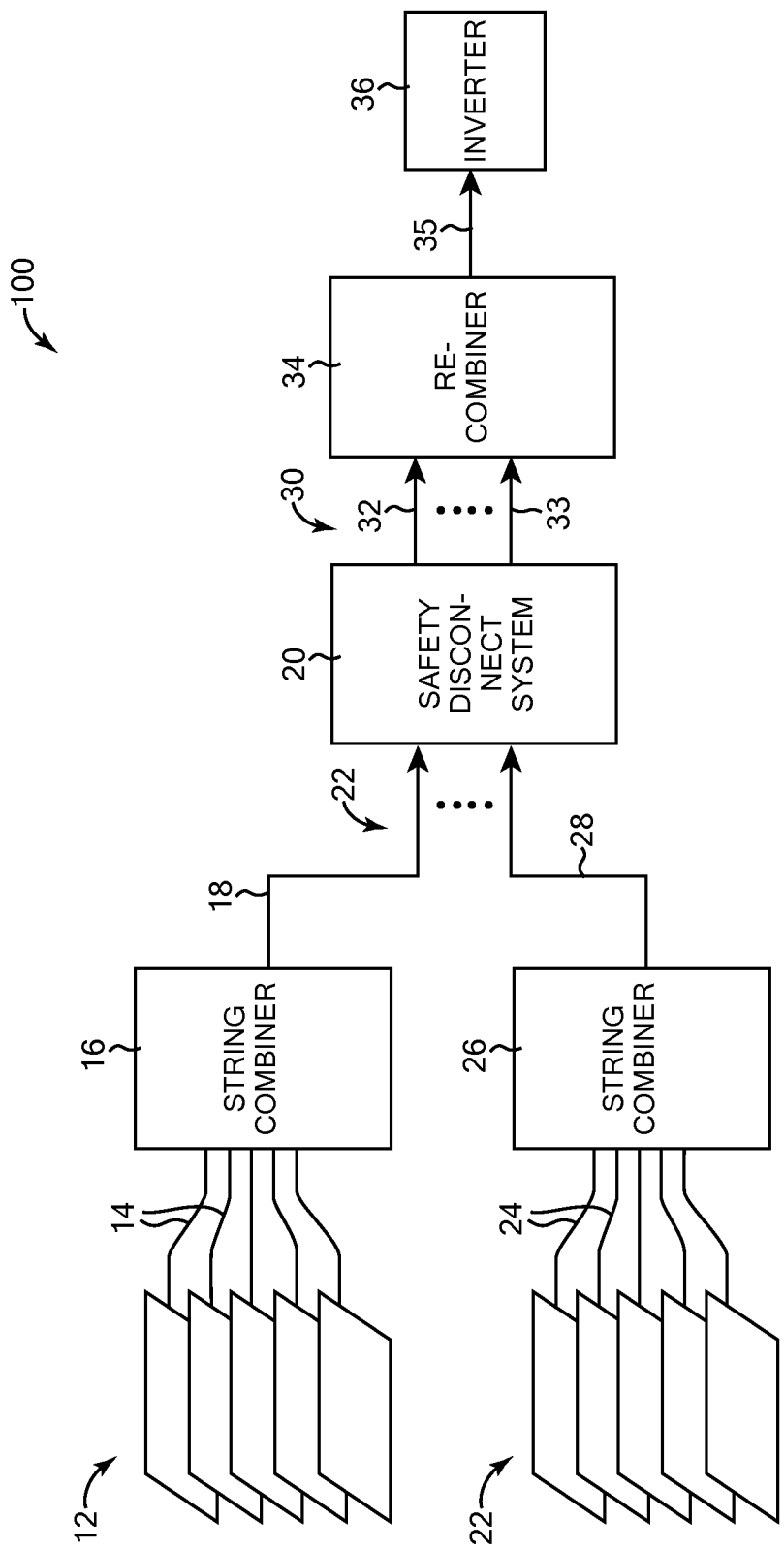
FIG. 1 is a block diagram of one example of a power supply system suitable for use with one or more embodiments described herein.

FIG. 1 is a block diagram of one example of a power supply system 10 suitable for use with one or more embodiments described herein. System 10 can include a number of sources 12 which provide electrical current on output wires 14. The sources 12 can be, for example, solar panels and/or photovoltaic cells in a photovoltaic system or other system which each generate current based on exposure to light, such as sunlight. Each output wire 14 from a power source 12 is connected to a string combiner 16, which combines the different currents on wires 14 into a single output 18.

The string combiner output 18 can be connected as an input power line to a safety disconnect system 20, which receives an input power line from each of multiple string combiners. For example, a second set of power sources 22 can output current on associated wires 24 that are connected to a string combiner 26, and the string combiner 26 combines these currents into an output 28 connected to the safety disconnect system 20 as an input power line. Additional string combiner outputs can also be connected to safety disconnect system 20. The power lines 18 and 28 are included in the input power lines 22 which are input to the safety disconnect system 20. The disconnect system 20 provides outputs as output power lines 30, where each output power line corresponds to and is paired with one of the input power lines. For example, output power line 32 can correspond to input power line 18, and output power line 33 can correspond to input power line 28. The output power lines 30 can be connected to a recombiner 34, which combines the currents from the multiple lines 30 into a single output 35 which can be provided to other power components, such as an inverter 36 that converts the DC current from the recombiner into AC current for typical home or business use.

In the described example, the disconnect system is placed closer to the power source than the recombiner, allowing more protection to the user since there is less current on each power line at such stages. In other embodiments, the safety disconnect system 20 can be connected the output of one or more recombiners 34. Alternatively, power sources 12 and 22 can be directly connected to the safety disconnect system 20. The disconnect system 20 provides switches to allow disconnecting any or all of the power lines from any downstream components or loads of the power system.

Other systems suitable for use with the features described herein can also or alternatively include other or different types of power sources than solar panels 12 and 22. For example, other power systems providing DC current may be similar to solar power systems and can take advantage of one or more of the features described herein, as well as other types of power systems.

Figure 3:
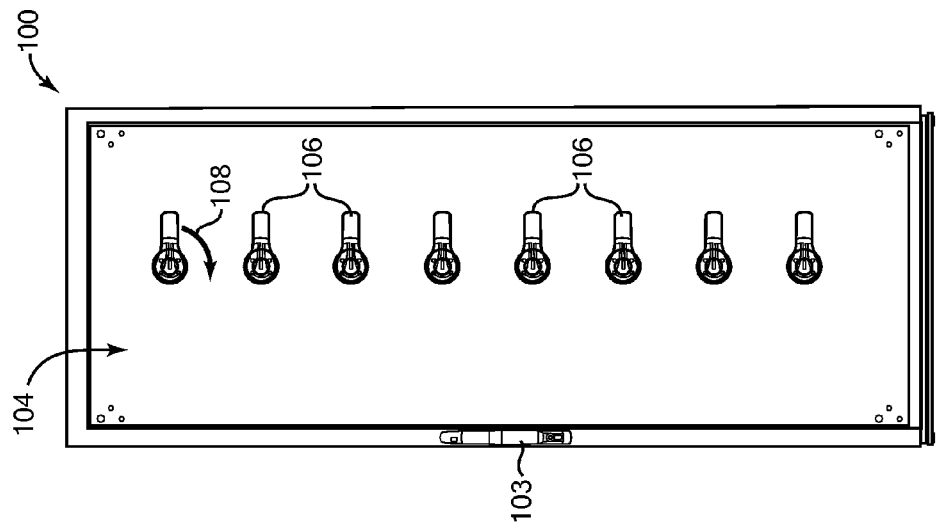
FIG. 3 is a front view of a dead front of the enclosure of the system of FIGS. 2-3.
Figure 2:
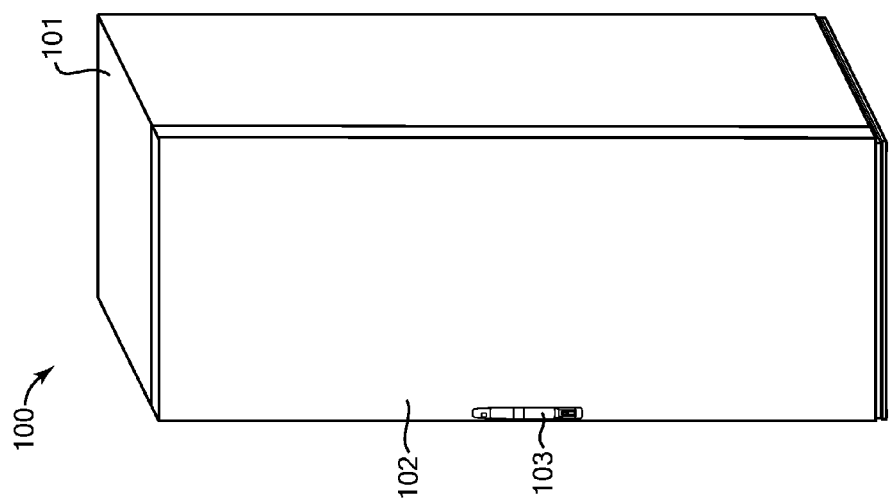
FIG. 2 is a front view of a first example of a safety disconnect system including features described herein and using rotatable switch handles.

FIGS. 2 and 3 illustrate a first example safety disconnect system 100 including features described herein and using rotatable switch handles. For example, system 100 can be an example of a safety disconnect system 20 used in a system as shown in FIG. 1, or used in other power systems.

FIG. 2 is a front view of a system 100. System 100 includes an enclosure or housing 101 that holds the components of the system. The enclosure 101 is shown in FIG. 1 as an upright cabinet, typically made of a suitable protective and/or weatherproof material such as a metal (steel, stainless steel, etc.), fiberglass, or plastic. The enclosure 101 can be a free-standing cabinet situated on a ground surface such as a floor that requires a simple, less costly installation than typical mounted safety disconnect boxes that are connected to wall surfaces above a ground surface. In some embodiments, the enclosure 101 has a small footprint, e.g. is narrow in length and width, allowing it to be placed in a large variety of locations. A small height also contributes to the compactness of the enclosure, allow flexibility in its placement. Other enclosure configurations and shapes can be used in other embodiments. A lockable door 102 can be openable by a handle 103 and protects the inner components and prevents easy access to the power components for safety reasons.

FIG. 3 is a front view illustrating a dead front 104 of the enclosure which is located behind the door 102 and exposed when the door is opened, and is a second safety feature to protect operators from the current and voltage of the system 100. A number of rotatable switch handles 106 are accessible in this example, where each switch handle 106 is connected to a switch corresponding to one of the input power lines and one of the corresponding output lines of the system 100.

Each switch handle 106 can be rotated by an operator, e.g. by 90 degrees or other amount in other embodiments, to open the associated switch connected between associated input and output power lines, thereby disconnecting the portion of the power system that is downstream of the safety disconnect system 100 (connected to the output power lines) from the power provided on the input power lines. This allows an operator to conveniently disconnect power on individual lines which need servicing or for test purposes.

In some embodiments having a dead front 104, a safety feature can be included that requires that all the switch handles 106 be rotated to an open (disconnecting) position to disconnect the power on all lines, which allows the dead front panel to be opened by an operator to expose the components located behind the dead front 104.

In a solar power system, for example, the multiple power lines connected to the disconnect system each may carry a DC voltage. To isolate any component of the system, all the power lines must be disconnected. If only one or less than all lines are disconnected, then the connected sources can backfeed to the disconnected line(s) through the load, creating a live line where a disconnected line is desired.

FIGS. 4A and 4B are side and front views, respectively, of one example of the interior of the enclosure of the safety disconnect system 100 of FIG. 2. The front view of system 100 shown in FIG. 4B has the dead front 104 removed. System 100 includes multiple switches 120 which, in the present example, are arranged in approximately linear vertical column layout with respect to the side view of FIG. 4A. The switches are also arranged in this example such that they are positioned in an approximate vertical column with respect to the front view of FIG. 4B. Each switch 120 is connected to a switch handle 106 by a shaft 122, such that rotating the handle 106 by an operator (e.g. as shown by arrow 108) rotates the central member of the corresponding switch to close or open the switch depending on the direction of rotation.

A staggered vertical orientation of the disconnect switches 120 as shown in FIG. 4A, in which some of the switches 120 are offset on a different vertical axis to allow some overlap of switches in the vertical dimension. This arrangement can be used in some embodiments to allow a greater number switches to be placed in a particular vertical dimension, thus allowing the enclosure 101 to have a smaller overall vertical dimension. This can be useful, for example, for larger switches 120 that can handle greater magnitudes of currents. In other embodiments, smaller switches 120 designed for smaller currents can be used, which are small enough to be stacked in an approximate vertical column without such staggering (similar to the circuit breakers of FIGS. 7A-7B, below). The approximate vertical column of switches 120 also allows the enclosure 101 to have smaller width and length dimensions and have a small footprint, increasing the ease and flexibility of installation. In some embodiments, all the disconnect switches needed by the power system can be included in the single enclosure 101. Some embodiments can provide some or all of the switches 120 to be connected in series.

Multiple input lines 126 are routed into the enclosure on one side of the switches 120, and corresponding multiple output power lines 130 are routed out of the enclosure on the other side of the switches 120. In the example of FIGS. 4A and 4B, each switch 120 has a terminal 124 connected to an associated input power line 126 on one side of the switches, and has a terminal 128 on the other side of the switch connected to an associated output power line 130. Some embodiments can, as shown, route the input power lines 126 and output power lines 128 through one or more openings in a bottom panel 132 of the enclosure 101.

Each switch 120 thus operates to connect or disconnect the associated pair of input power line 126 and output power line 128 connected to that switch 120, based on the position of the handle 106 connected to the switch. The single enclosure 101 houses multiple disconnect switches for the multiple power wires, allowing selective disconnect ability for each individual power line, and allowing all the power lines to be routed to a single enclosure. This configuration reduces expense compared to providing a separate enclosure for each disconnect option on each power line. Furthermore, in some embodiments, the power lines 126 and 130 can be routed into the enclosure 101 via an opening in a bottom panel of the enclosure as shown in FIG. 4B, such that these power lines are not exposed and do not need to be enclosed in a protective cladding or other protection or safety barrier, thereby decreasing the cost as compared to previous disconnect systems.

In some alternate embodiments, multiple switches can be combined and be associated with a single handle 106. For example, two switches 120 can be positioned along the same horizontal axis of a single shaft 122 such that the single shaft 122 is connected to both switches. In the example of FIG. 4A, an example of a second switch is indicated by dashed lines 121. In response to the associated handle 106 being rotated, both of these switches 120 and 121 are opened or closed simultaneously. This arrangement allows fewer handles 106 to be used for a larger number of switches 120 and power line pairs, which may be required if there is a limit to the number of handles allowed on the enclosure 101.

In some embodiments, fuses can be provided connected to the switches 120. For example, a fuse can be connected between each input power line 126 and the associated switch 120. Such fuses can provide automatic overcurrent protection.

The disconnect system 100 (or other system embodiments described herein) can in some embodiments include electronic current monitoring. For example, a monitoring sensor 140 can be included in or connected to each switch 140 or each input or output power line for monitoring current passing through that switch 120 or through the associated power line. In the described embodiment, a monitoring sensor 140 is shown connected on a jumper connected between two of the poles of each multi-pole switch 120 to monitor the current going through or into the switch. For example, sensor 140 can be a Hall Effect sensor in the approximate shape of a ring that is placed around the jumper contact, wire, or power line conducting the current that is measured. Other types of sensors can alternately be used. Each sensor 140 can be in communication via wired or wireless connection with one or more controllers or devices (not shown) that can receive signals from the sensors 140 and provide an output indicating the magnitude of current sensed by each sensor 140, and this output can be provided to an operator using a display screen or other connected output device. In other embodiments, the sensor 140 can be placed around input or output terminals to the switches 120, around the input wire 126 to each switch 120, or around the output wire 130 from each switch.

Figure 6:
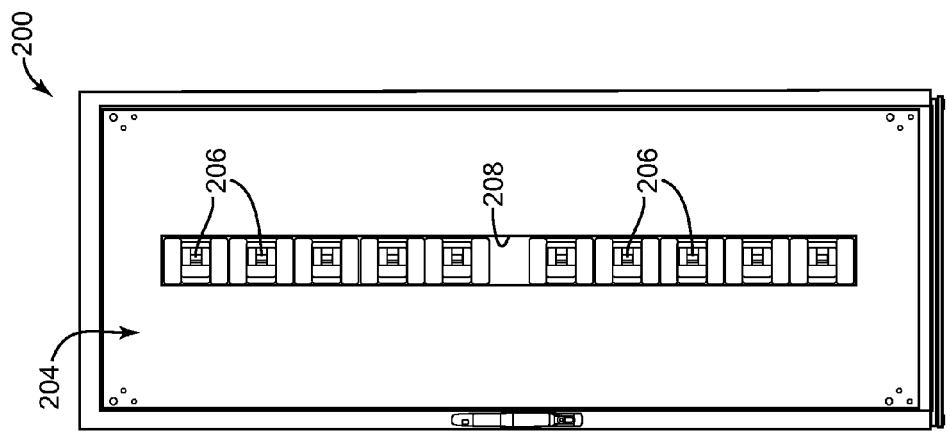
FIGS. 5 and 6 are front views of a second example of a safety disconnect system including features described herein.
Figure 5:
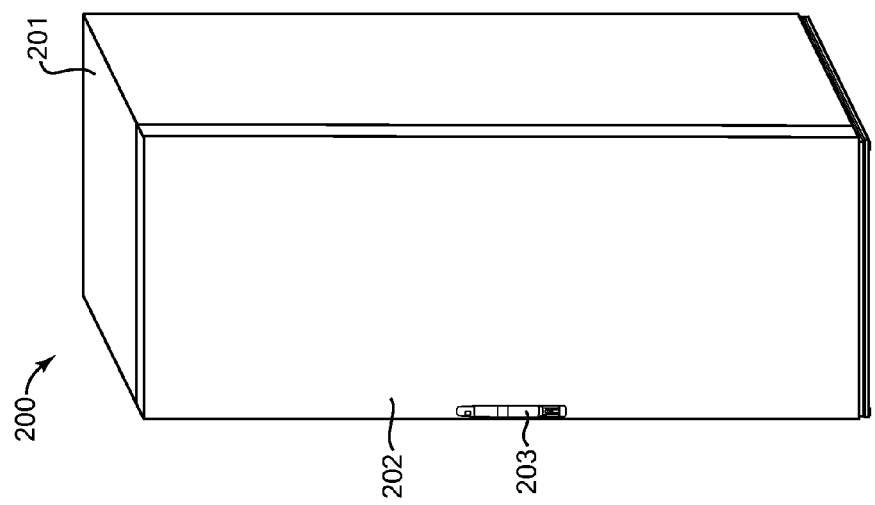

FIGS. 5 and 6 illustrate a second example of a safety disconnect system 200 implementing aspects of the features described herein and suitable for use, for example, in a system such as shown in FIG. 1. System 200 includes an enclosure or housing 201 that holds the components of the system, which in this example is shown as an upright cabinet similar to FIG. 2. Other enclosure configurations and shapes can be used in other embodiments. A lockable door 202 can be included to protect the inner components and prevent access to the power components, and can be openable using a handle 203. FIG. 6 illustrates a dead front 204 which is located behind the door 202 and is exposed when the door is opened, to protect operators from the current and voltage of the system.

A number of circuit breaker handles 206 are exposed for access by an operator in this embodiment, which can be exposed by an opening 208 in the dead front 204. Each handle 206 is connected to a circuit breaker connected between a corresponding input power line and output power line in the system 200. Each handle 206 can be flipped or otherwise activated by an operator to open an associated circuit breaker switch connected to an associated power line, thereby disconnecting the associated output power line from the power source providing power on the associated input power line. Some embodiments can include an additional safety mechanism to prevent opening the dead front 204 unless all the input power lines are disconnected from their associated output power lines. For example, a master rotary switch (not shown) can be used to disconnect all power to all lines.

Figure 7B:
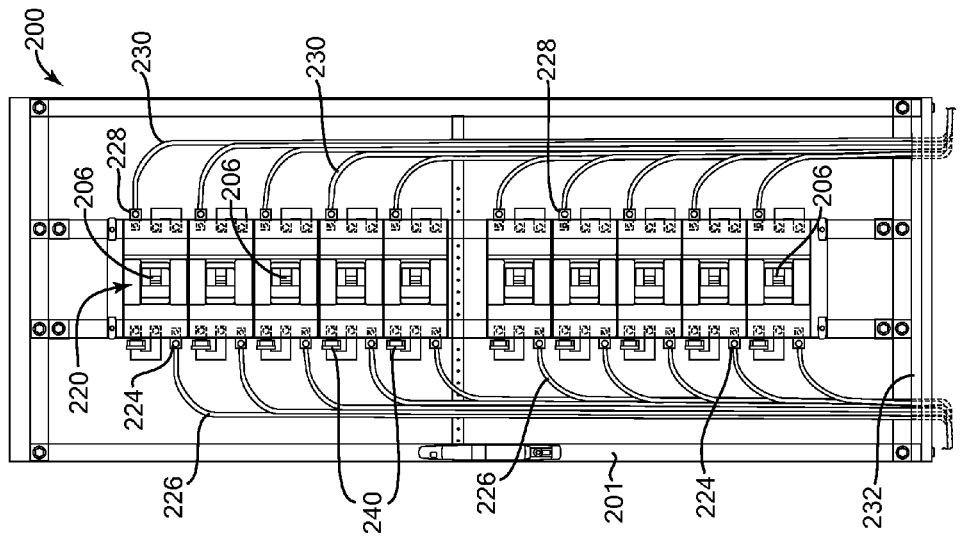
FIGS. 7A-7B are side and front views, respectively, of one example of the interior of the enclosure of a safety disconnect system of FIGS. 5-6.
Figure 7A:
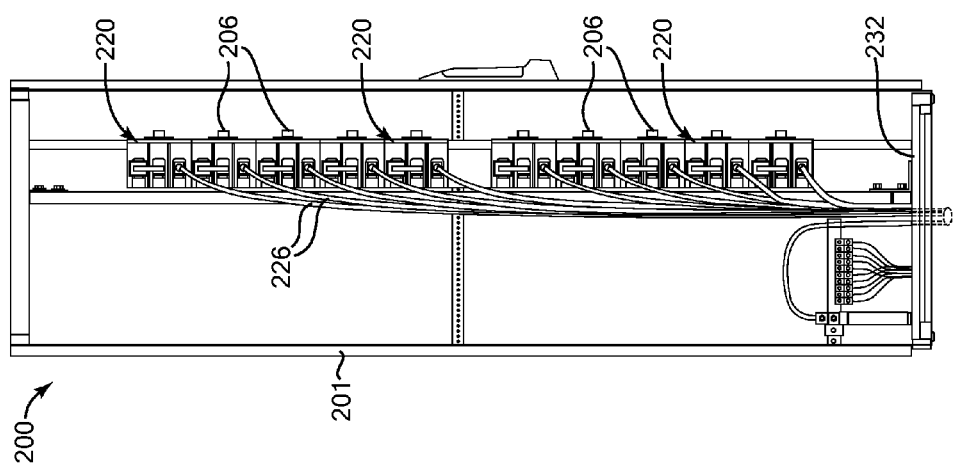

FIGS. 7A and 7B are side and front views, respectively, of the interior of the safety disconnect system 200 including circuit breakers. The front view of system 200 shown in FIG. 7B has the dead front 204 removed. System 200 includes multiple circuit breakers 220 arranged in approximately linear vertical column layout with respect to the side view of FIG. 7A. The circuit breakers 220 are also arranged such that they are positioned in an approximate vertical column with respect to the front view of FIG. 7B. Other positional arrangements of circuit breakers 220 can be provided in other embodiments.

Each circuit breaker 220 has a terminal 224 connected to an associated input power line 226 on one side of the circuit breaker, and has a terminal 228 on the other side of the circuit breaker connected to an associated output power line 230. In some embodiments, the power lines 226 and 230 can be routed into the enclosure 201 via an opening in a bottom panel 232 of the enclosure 201, such that these power lines are not exposed and do not need to be enclosed in a protective cladding or other protection or safety barrier.

Each circuit breaker 220 includes a handle 206 that is accessible through the dead front 204 as described above. For some embodiments, the handle 206 can be flipped between two positions to open and close the associated switch. Other embodiments can provide other types of switch mechanisms instead of handles, such as buttons, levers, dials, etc. An operator can flip or otherwise activate a handle 206 on a circuit breaker 220 to disconnect/reconnect the associated input power line from/to the associated output power line, thereby disconnecting or connecting the associated output power line 230 from or to the corresponding input power line 226. Each circuit breaker 220 also has the ability to automatically trip and disconnect the input power line from the associated output power line if a fault condition is detected, such as an amount of current sensed on an input power line that is over a predetermined threshold amount, and can be reset by an operator to reconnect the input and output power lines for the tripped circuit breaker.

In some embodiments, a central disconnect switch can be added as a safety feature to the enclosure 200. For example, all of the input power lines and output power lines can be connected to the central switch, such that all power lines can be disconnected using the single central switch. This central switch can be provided on the dead front 204 or on the outside door 203, and can prevent the opening of the dead front or door unless the central switch is opened to disconnect all the input and output power lines in the enclosure. For example, the central switch can include a rotatable handle similar to the enclosure 100 of FIG. 3, or other type of switching mechanism.

Similarly to the embodiment of FIGS. 4A and 4B, system 200 can include current monitoring. For example, a current monitoring sensor 240 can be connected to each circuit breaker 220 or power line to monitor the current flowing into, through, or out of the circuit breaker or power line. For example, in some embodiments, a Hall Effect sensor can be positioned around the jumper connection between two of the poles of the circuit breaker, as shown, or other types of sensors can be used. Alternatively, the sensors 240 can be connected to the input wires 226 or the output wires 230 or at the input or output terminals of the circuit breaker. The sensors can provide sensor signals to one or more controllers via a wired or wireless connected to provide output to an operator indicating the current magnitudes flowing through the circuit breakers 220 and/or power lines as sensed by the sensors.

Figure 8:
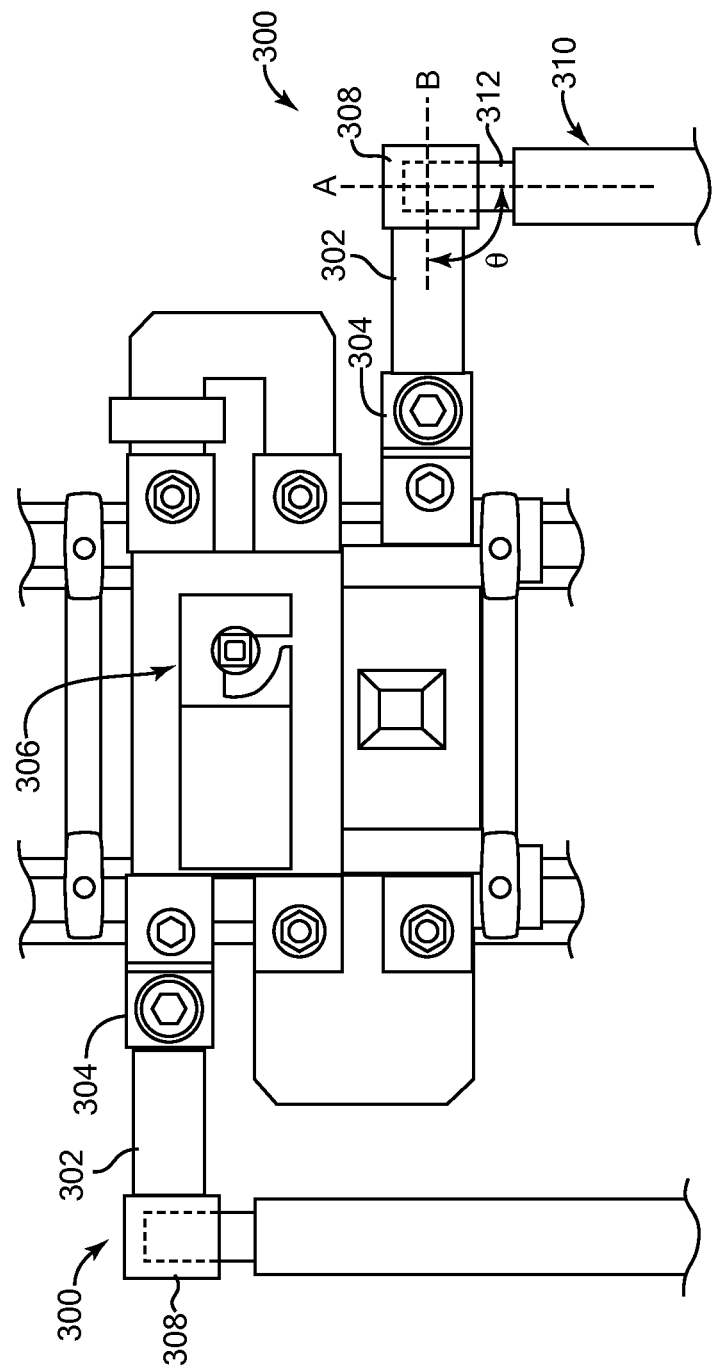
FIG. 8 is a detail view of an alternate embodiment of a connection adaptor which can be used with some embodiments of a safety disconnect system.

FIG. 8 is a detail view of an alternate embodiment of a connection adaptor 300 which can be used with some embodiments of a safety disconnect system. Connection adaptor 300 includes an extension portion 302 which is connected to terminal 304 of a disconnect switch 306. For example, the terminal 304 can be a terminal 124 or 128 of a disconnect switch 120 of the embodiment of FIGS. 4A-4B, or a terminal 224 or 228 of a circuit breaker 220 of the embodiment of FIGS. 7A-7B. The connection adaptor 300 can be connected to the input terminal or the output terminal of the switch 306, or both terminals in other embodiments.

The connection adaptor 300 also includes a terminal 308 for receiving an input or output power line 310, such as a power line 126 or 130 shown in the example of FIGS. 4A-4B or a power line 226 or 230 in the example of FIGS. 7A-7B. A conductive end portion 312 of the power line 310 can be inserted into the terminal 308 and tightened by screws (not shown) or otherwise physically secured within the terminal 308. The adaptor includes conductive material such as copper, aluminum, or other conductive metal or other material, and creates an electrical connection between the terminal 308 and the cable 310.

The power line 310 has a lengthwise axis A extending down its length at the conductive end portion 312, and the terminal 304 and extension portion 302 have a lengthwise axis B extending in the direction of their orientation, i.e., the direction for terminal 304 that receives a conductive end of a wire. The lengthwise axes A and B are oriented at different angles as shown in FIG. 8. The terminal 308 is oriented to receive the end portion 312 of the power line 300 at an angle $\theta$ with respect to the extension portion 302, i.e., an angle $\theta$ between the lengthwise axes A and B. In the example shown, this angle $\theta$ is about 90 degrees, but can be other angle values in other embodiments.

The angle $\theta$ allows a cable 310 to be attached to a terminal input or output (such as on a switch 306 or other terminal device or structure) without having to bend the cable 310 to fit it into the standard terminals which are oriented horizontally in the configuration shown in FIG. 8 (i.e., an angle $\theta$ of about zero degrees). Bending of the cable 310 as required for many prior power switch systems adds a significant amount of assembly time to a disconnect system, since typical power cables are thick and not easily bent, especially when cables having a solid core conductor are used. Furthermore, the cables may have to be fit into tight spaces on either side of the switches 306 or terminals 304. The adaptor 300 allows easier installation of cables, especially in multiple-switch systems.

The connection adaptor 300 has additional advantages. For example, the adaptor 300 can be made of a material that creates a thermal barrier that can reduce stress on the switch 306 and allow the connected cable to reach higher temperatures. For example, a common temperature rating for switches 306 is 75 degrees Celsius, which requires that the connected cables not reach more than 75 degrees. When using the adaptor 300, the connected cable 310 can reach greater temperatures, such as 90 degrees Celsius, without damaging the switch 306 since the thermal barrier of adaptor 300 protects the connected switch 306. This allows smaller, less expensive cables to be used, since smaller cables reach a higher temperature for the same amount of current.

In some embodiments, fins or other thermal or heat-dissipation structures can be attached to or included on the adaptor 300 similarly to heatsinks to allow even greater heat dissipation (e.g., via air), thus increasing the thermal barrier further.

The described safety disconnect system is a compact, low-cost disconnect solution for a power system that allows multiple switches for power lines to be integrated into a single easily-installed enclosure. Some disconnect system embodiments can also conveniently include current sensing and monitoring. The inclusion of multiple power lines in a single enclosure allows a current monitoring system to be provided much more cheaply and easily than if multiple disconnect enclosures are used, e.g., a single controller can be connected to multiple sensors within the enclosure. The advantageous size, cost, functions, and safety features of the described safety disconnect system reduces labor and expense compared to the enclosures used previously.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art.

What is claimed is:

1. A safety disconnect system for a power system, the safety disconnect system comprising:
    an enclosure operative to receive a plurality of input power lines into the enclosure and provide a plurality of output power lines out of the enclosure, each input power line coupled to and paired with a corresponding one of the output power lines, wherein each input power line and output power line is operative to provide power from a power source; and
    a plurality of multi-pole switches provided in the enclosure, wherein the multi-pole switches each include a rotatable handle, each multi-pole switch of the plurality of multi-pole switches coupled between an associated one of the pairs of input power line and output power line, each multi-pole switch operative to disconnect the associated input power line from the corresponding output power line, wherein the multi-pole switches are accessible behind an opening door of the enclosure, wherein a safety panel is positioned behind the door and surrounding the multi-pole switches, the safety panel blocking access to connections of the input power lines and output power lines within the enclosure, wherein the safety panel is openable by an operator only in response to opening all of the multi-pole switches such that all of the input power lines and output power lines are disconnected.

2. The safety disconnect system of claim 1, wherein each multi-pole switch is operative to disconnect the associated input power line from its corresponding output power line independently of the connections of the other input power lines and output power lines.

3. The safety disconnect system of claim 1, wherein the enclosure is located on a ground surface, and wherein the enclosure includes a bottom panel operative to allow the input power lines and the output power lines to be routed into the enclosure from the ground surface through the bottom panel.

4. The safety disconnect system of claim 1, wherein each of the multi-pole switches is included in a circuit breaker.

5. The safety disconnect system of claim 1, further comprising a current sensing system operative to sense a current flowing through each pair of input power line and output power line.

6. The safety disconnect system of claim 1, wherein at least one of the input power lines and output power lines includes an adaptor coupled between the at least one power line and the associated multi-pole switch, the adaptor including a bend to allow connection between an end of the at least one power line and an input terminal having lengthwise axes at different angles.

7. The safety disconnect system of claim 6, wherein the adaptor is operative to provide a thermal barrier protecting the associated multi-pole switch from heat generated on the at least one power line connected to the adaptor.

8. The safety disconnect system of claim 1, wherein the input power lines receive power from at least one solar panel.

9. The safety disconnect system of claim 8, wherein the input power lines are connected to at least one string combiner that receives power from at least one solar panel.

10. The safety disconnect system of claim 8, wherein the output power lines are connected to at least one recombiner that combines the output power lines into a lesser number of power lines.

11. A method for providing a safety disconnect system, the method comprising:
providing an enclosure operative to receive a plurality of input power lines into the enclosure and provide a plurality of output power lines, each input power line coupled to and paired with a corresponding one of the output power lines, wherein each input power line and output power line is operative to provide power from a power source; and
providing a plurality of multi-pole switches in the enclosure, each multi-pole switch of the plurality of multi-pole switches connecting an associated one of the input power lines to a corresponding one of the output power lines and operative to disconnect the associated input power line from the corresponding output power line, wherein the multi-pole switches are accessible behind an opening door of the enclosure, and wherein a safety panel is positioned behind the door, the safety panel blocking access to connections of the input power lines and output power lines within the enclosure, wherein the safety panel is openable by an operator only in response to opening all of the multi-pole switches such that all of the input power lines and output power lines are disconnected.

12. The method of claim 11, wherein the enclosure is located on a ground surface, and wherein the input power lines and the output power lines are routed into the enclosure from the ground surface through a bottom panel of the enclosure.

13. The method of claim 11, wherein each of the multi-pole switches is coupled to one of the following: a rotatable multi-pole switch and a circuit breaker.

14. The method of claim 11, further comprising sensing a current flowing through each pair of input power line and output power line.

15. The method of claim 11, wherein at least one of the input power lines and output power lines includes an adaptor coupled between the at least one power line and the associated multi-pole switch, the adaptor including a bend to allow connection between an end of the at least one power line and an input terminal having lengthwise axes at different angles.

16. The method of claim 11, wherein the input power lines receive power from at least one solar panel.

* * * * *